(12) United States Patent
Paulsen et al.

(10) Patent No.: US 12,235,831 B2
(45) Date of Patent: Feb. 25, 2025

(54) STITCHING EVENT DATA USING IDENTITY MAPPINGS

(71) Applicant: Adobe Inc., San Jose, CA (US)

(72) Inventors: Trevor Paulsen, Lehi, UT (US);
Joshua Butikofer, Lehi, UT (US);
Ankita Mahajan, Uttar Pradesh (IN);
Adrian Tanase, Ilfov (RO)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/085,479

(22) Filed: Dec. 20, 2022

(65) Prior Publication Data
US 2023/0123539 A1 Apr. 20, 2023

Related U.S. Application Data

(63) Continuation of application No. 16/783,954, filed on Feb. 6, 2020, now Pat. No. 11,567,929.

(51) Int. Cl.
G06F 16/23 (2019.01)
G06F 7/08 (2006.01)

(52) U.S. Cl.
CPC ............ G06F 16/2379 (2019.01); G06F 7/08 (2013.01)

(58) Field of Classification Search
CPC ............................... G06F 16/2379; G06F 7/08
USPC ......................................................... 707/752
See application file for complete search history.

(56) References Cited

U.S. PATENT DOCUMENTS

| 10,440,009 | B1* | 10/2019 | Manwiller | H04L 63/083 |
| 10,552,274 | B1* | 2/2020 | Zhao | G06F 11/2082 |
| 10,579,737 | B2* | 3/2020 | Brixey | G06F 40/169 |
| 11,146,862 | B2* | 10/2021 | Russell | H04N 21/8456 |
| 11,151,125 | B1 | 10/2021 | Dwivedi et al. | |
| 2006/0123340 | A1 | 6/2006 | Bailey et al. | |
| 2006/0277212 | A1 | 12/2006 | Error | |
| 2007/0011304 | A1 | 1/2007 | Error | |
| 2009/0177610 | A1 | 7/2009 | Kawamura et al. | |
| 2010/0088726 | A1* | 4/2010 | Curtis | G11B 27/034 725/45 |

(Continued)

OTHER PUBLICATIONS

U.S. Appl. No. 16/783,954, "Final Office Action", May 6, 2022, 50 pages.

(Continued)

Primary Examiner — Amy Ng
Assistant Examiner — Antonio J Caiado
(74) Attorney, Agent, or Firm — Kilpatrick Townsend & Stockton LLP

(57) ABSTRACT

This disclosure involves stitching event data using identity mappings. An event analytics system generates and stores an event dataset including first event data for a first set of events associated with a user. The first event data includes timestamps and a device identifier. The system identifies second event data for a second event associated with the user. The second event data includes a timestamp, the device identifier, and a user identifier. The system appends the second event data to the event dataset. Based on the second event data, the system generates and stores an identity mapping that maps the device identifier to the user identifier. Based on the identity mapping and a predetermined look-back window, the system updates the first event data to include the user identifier.

14 Claims, 9 Drawing Sheets

(56) References Cited

U.S. PATENT DOCUMENTS

| | | | |
|---|---|---|---|
| 2010/0313264 A1* | 12/2010 | Xie | H04L 63/101 |
| | | | 726/22 |
| 2013/0194604 A1 | 8/2013 | Asano | |
| 2014/0095702 A1 | 4/2014 | Kalus et al. | |
| 2015/0236925 A1* | 8/2015 | Bodz | G06Q 30/0269 |
| | | | 709/203 |
| 2017/0352055 A1 | 12/2017 | Cohn et al. | |
| 2018/0082122 A1* | 3/2018 | Verdejo | G06V 20/80 |
| 2018/0246983 A1 | 8/2018 | Rathod | |
| 2019/0007509 A1 | 1/2019 | Lipka | |
| 2019/0272387 A1 | 9/2019 | Gkoulalas-Divanis | |
| 2019/0332807 A1 | 10/2019 | Lafever et al. | |
| 2020/0106844 A1* | 4/2020 | Glommen | H04L 67/146 |
| 2020/0357026 A1 | 11/2020 | Liu | |
| 2020/0380376 A1* | 12/2020 | Jain | H04L 63/101 |
| 2021/0109935 A1* | 4/2021 | Hsiao | G06F 16/2456 |
| 2021/0110328 A1 | 4/2021 | Hsiao et al. | |
| 2021/0271531 A1 | 9/2021 | Paulsen et al. | |
| 2021/0281650 A1 | 9/2021 | George et al. | |
| 2022/0043807 A1* | 2/2022 | Dwivedi | G06F 16/2379 |

OTHER PUBLICATIONS

U.S. Appl. No. 16/783,954 , "Non-Final Office Action", Dec. 3, 2021, 41 pages.

U.S. Appl. No. 16/783,954 , "Notice of Allowance", Sep. 21, 2022, 9 pages.

\* cited by examiner

| Timestamp 402 | Cookie ID 404 | User ID 406 | Page 408 |
|---|---|---|---|
| 1  402A | 123  404A | --  | Homepage  408A |
| 2  402B | 123  404B | --  | Product Detail  408B |
| 3  402C | 123  404C | --  | Shopping Cart  408C |
| 4  402D | 123  404D | --  | Check Out  408D |
| 5  402E | 123  404E | trevor  406E | Create Account  408E |
| 6  402F | 123  404F | trevor  406F | Purchase Page  408F |

| Cookie ID | User ID | Timestamp this relationship was discovered* |
|---|---|---|
| 123  404E | trevor  406E | 5  402E |

| Timestamp 422 | Cookie ID 424 | User ID 426 | Page 428 | "Stitched" ID 430 |
|---|---|---|---|---|
| 1  422A | 123  424A | --  426A | Homepage  428A | trevor  430A |
| 2  422B | 123  424B | --  426B | Product Detail  428B | trevor  430B |
| 3  422C | 123  424C | --  426C | Shopping Cart  428C | trevor  430C |
| 4  422D | 123  424D | --  426D | Check Out  428D | trevor  430D |
| 5  422E | 123  424E | trevor  426E | Create Account  428E | trevor  430E |
| 6  422F | 123  424F | trevor  426F | Purchase Page  428F | trevor  430F |

STITCHING EVENT DATA USING IDENTITY MAPPINGS

CROSS-REFERENCE TO RELATED APPLICATIONS

This application is a continuation of U.S. patent application Ser. No. 16/783,954, filed on Feb. 6, 2020, now allowed, the contents of all of which are incorporated herein by reference.

TECHNICAL FIELD

This disclosure generally relates to data analytics. More specifically, but not by way of limitation, this disclosure relates to stitching event data using identity mappings.

BACKGROUND

Collecting and analyzing user data is increasingly popular. A major area of focus is web analytics, which deals with the analysis of data created by website usage. For instance, web analytics can be used to mine visitor traffic data. A variety of visitor traffic data is measured such as what browser is being used, what links on a given web page were selected, whether a product was purchased, and so forth. There are number of web analytics tools presently available that capture and analyze data related to website usage.

Some existing systems "stitch" or "blend" data to tie web traffic data together with other web traffic data. Typically, large amounts of uncorrelated data is collected, and must be analyzed to correlate the data. Correlating the data may involve storing web data in association with an identifier based on a browser or device used. In some existing systems, the web data may be improperly correlated with the identifier because devices can be shared, users often use multiple browsers or devices, and user identifiers are not always cleanly implemented and may have to be retroactively cleaned or corrected.

Accordingly, existing techniques stitch a relatively large amount of data (e.g., collected over the course a window of weeks or months). Over the course of such a window, the data is stored in a form that is not yet useable for analytics purposes. Further, stitching such large amounts of data in batches places a significant drain on computational resources. Thus, existing stitching techniques are computationally inefficient, do not provide results in a timely fashion, and may not provide accurate results.

SUMMARY

Certain embodiments involve stitching event data using identity mappings. An identity mapping associates a user identifier with a device identifier and can be used to efficiently correlate event data, such as web traffic data, with a particular user. For example, an event analytics system generates and stores an event dataset including first event data for a first set of events associated with a user. The first event data includes a plurality of timestamps and a device identifier. The event dataset connects the first set of events in chronological order based on the timestamps and the device identifier. The system identifies second event data for a second event associated with the user. The second event data includes a timestamp, the device identifier, and a user identifier. The system appends the second event data to the event dataset. Based on the second event data, the system generates and stores an identity mapping that maps the device identifier to the user identifier. Asynchronously to generating and storing the event dataset, based on the identity mapping and a predetermined look-back window, the system updates the first event data to include the user identifier.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4A depicts an example of an event dataset, according to certain embodiments of the present disclosure.

FIG. 4B depicts an example of an identity mapping, according to certain embodiments of the present disclosure.

FIG. 4C depicts an example of an event dataset that has been updated using the identity mapping of FIG. 4B, according to certain embodiments of the present disclosure.

DETAILED DESCRIPTION

Figure 1:
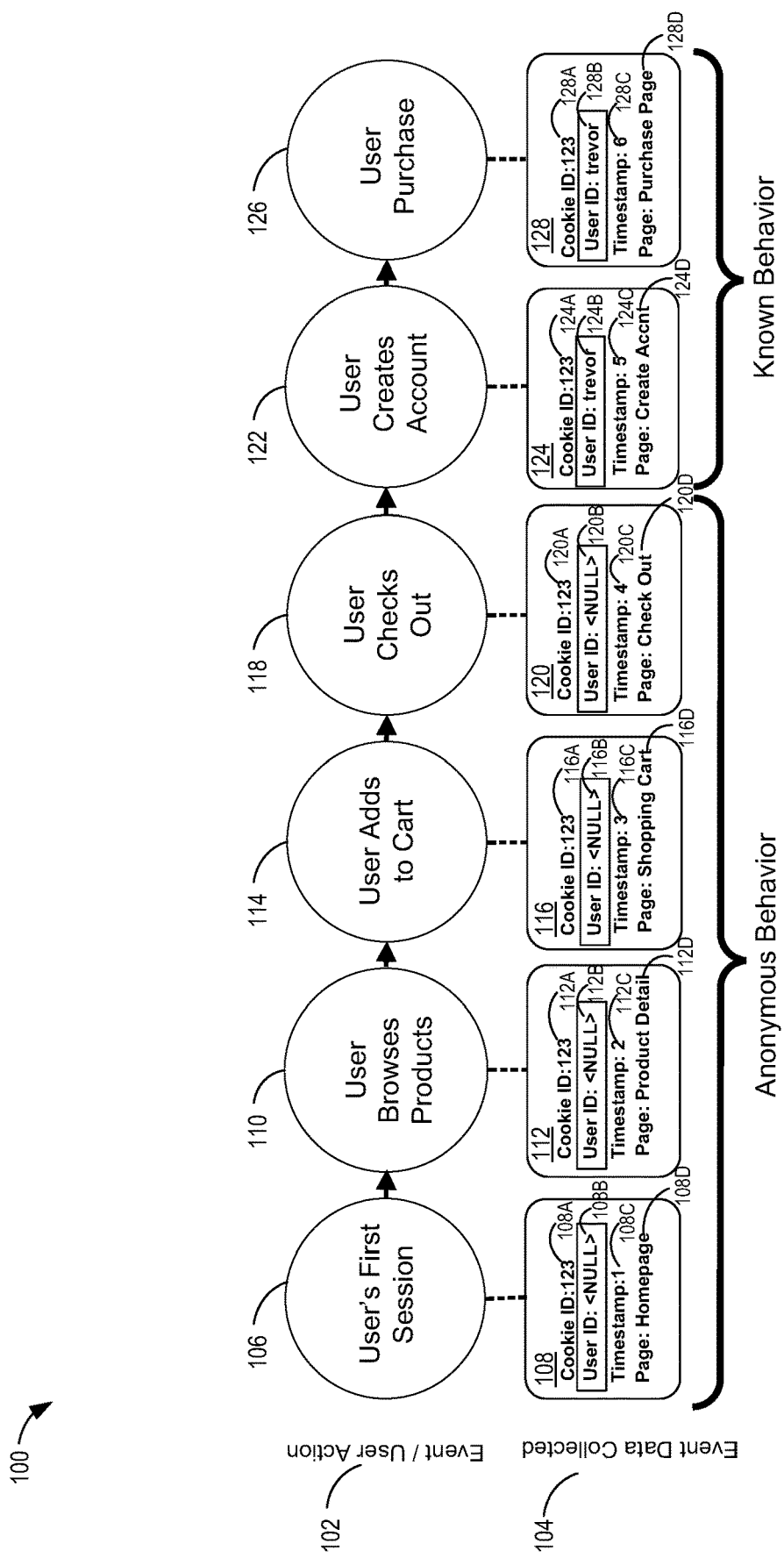
FIG. 1 depicts a schematic overview of event data used for event analytics, according to certain embodiments of the present disclosure.

The present disclosure includes systems and methods for stitching event data using identity mappings. An identity mapping associates a user identifier with a device identifier and can be used to efficiently correlate event data with a particular user. As explained above, conventional solutions for stitching data are limited by lags or omissions in data availability. In some cases, anonymous data is deleted. In some cases, data is held for weeks or months before it is stitched while ingested. This uses an excessive amount of computational resources by ingesting and stitching large datasets simultaneously. Certain embodiments described herein improve the performance of stitching systems by using event datasets that are updated asynchronously to ingesting event data. For example, event analytics systems described herein are used to track events related to a user, where the events may include online or offline interactions with the user. An event dataset may, for example, correspond to a data table with a row for each of a set of events. In some embodiments, first event data used to generate an event dataset is anonymous, and a user identifier is later acquired. When the event analytics system identifies a user identifier, the system generates an identity mapping, which maps the user identifier to a device identifier. The event analytics system uses the identity mapping to asynchronously update the event dataset to include the user identifier. Accordingly, the anonymous data can be blended with data corresponding to a known user, while maintaining up-to-date records and greatly increasing computational efficiency over prior techniques.

The following non-limiting example is provided to introduce certain embodiments. In this example, an event analytics system includes one or more computing systems that execute an event management module and an identity mapping module. The event management module is used to generate an event dataset based on event data gathered by the event analytics system. The event analytics system gathers event data including web browsing data from a user's smartphone and data associated with call center interactions with the user via a resource provider such as a merchant. The event management module generates an event dataset in the form of a table with a row corresponding to each of a series of events. The event dataset is used to analyze behavior of users, which in turn can be used to inform subsequent interactions with the user (or similar users) that are tailored to the user's behavior.

As users interact with a website via their user devices, the event analytics system identifies event data, based at least in part upon data gathered from each user device. Each event may correspond to a particular action, such as a click on the website. Much of the event data includes information such as a device identifier (e.g., a cookie identifier) and a timestamp (e.g., indicating a time of the event) that is not associated with a particular user. In some cases, such as when users log into the website, event data may include user identifiers. The event analytics system operates to identify mappings between device identifiers and user identifiers, so as to correlate specific user with events initiated by such users relative to the website, based on event data that was previously anonymous.

In particular, the event management module generates an event dataset based on first event data. The first event data is anonymous in that it includes information such as device identifiers and timestamps that do not uniquely identify a user. Subsequently, second event data is identified by the event analytics system. The second event data is user-specific, in that it includes information such as user identifiers, timestamps, and the device identifier. The event analytics system appends the second event data to the event dataset (e.g., by adding another entry to the event dataset).

The event analytics system then attempts to identify a relationship between a device identifier and a user identifier. When such a relationship is identified, the identity mapping module of the event analytics system generates and stores an identity mapping. The relationship between the device identifier and the user identifier may be identified based on event data gathered when a user logs into a website on a device (e.g., by analyzing the event data to identify elements associated with both a user identifier and a device identifier). As other examples, the relationship may be identified based on identifying a user identifier in CRM data, offline data, or a third-party identity mapping. The event analytics system may generate and store the identity mapping by storing the device identifier in association with the user identifier. The identity mapping may be generated and stored, for example, by generating and storing a table that includes the device identifier and the user identifier. This identity mapping can then be used to stitch the event dataset to specify the user identifier for each event. For example, an identity mapping table can be joined to the event dataset for each entry that includes the device identifier. Accordingly, the identity mapping can be used to uniquely identify a user based on event data that was previously anonymous. The event management module uses a predetermined look-back window to blend or stitch the event data. For example, every week, the event management module updates the event dataset to reflect the most up-to-date data available.

Although the anonymous event data was initially used to generate the event dataset, the identity mapping reveals that the events in the event dataset are associated with a particular user denoted by the user identifier received in the second event data. Based on the identity mapping and the predetermined look-back window, the event management module asynchronously updates the first event data to include the user identifier. The event management module may, for example, join the identity mapping to the event dataset such that each event is correlated with the user identifier. Accordingly, the event data that was initially identified without a user identifier is no longer anonymous and specifies the user based on the user identifier. By asynchronously updating the event dataset, the event analytics system optimizes each step for increased performance and a decrease in runtime. Further, as the event dataset is generated and appended as new data is received, the event dataset can be accessed and analyzed both before and after the update occurs.

As used herein, the term "event" is used to refer to an occurrence that may be associated with a user. Events may include detection of a user interaction with a website or application. For example, a user may click on a link, enter information, open an email, send an email, and so forth. Events may include in-person interactions. For example, a user may make an in-store purchase or return, or speak face-to-face with a representative. Events may include remote interactions with a representative such as a conversation with a call-center operator or a dialogue with a chatbot.

As used herein, the term "event data" is used to refer to data associated with an event. Event data may include a timestamp, device identifier, user identifier, website information, product information, an email address, a phone number, and/or any other suitable information.

As used herein, an "event dataset" is used to refer to a dataset including two or more events. For example, a set of event data, corresponding to ten events, is stored to a data table. As another example, a set of event data, corresponding to one hundred events, is correlated using pointers. The event dataset may connect a set of events in chronological order.

As used herein, the term "device identifier" is used to refer to an identifier associated with a particular device. An example of a device identifier is a cookie identifier, which is a unique identifier used to recognize a browser. Examples of device identifiers include an electronic chip identification (ECID), an Audience Manager unique user identifier (AAMUUID), and an Android advertising identifier (AAID). Another example of a device identifier is a universally unique identifier (UUID). Another example of a device identifier is an internet protocol (IP) address.

As used herein, the term "user identifier" is used to refer to an identifier of a user, such as a customer or potential customer. A user identifier may include a string of characters. Examples of user identifiers include a login identifier, a customer relationship management (CRM) identifier, an email address, a phone number, and a legal name.

As used herein, the term "identity mapping" is used to refer to a mapping between a device identifier and a user identifier. In some embodiments, an identity mapping may further include a timestamp representing a time at which the relationship between the device identifier and the user identifier was discovered. Such identity mappings can be used to stitch event data as described herein.

Certain embodiments described herein facilitate using event data to analyze the behavior of user. In some embodiments, the user behaviors are used to take appropriate action in response to a certain event (e.g., transmitting a sale email to a user after prior user behavior indicates the user has made a purchase after receiving a similar email). The use of event data as the data is received allows the system to leverage anonymous browser data, which can be quite useful, yet in some prior systems such anonymous data would simply be discarded.

FIG. 1 depicts a schematic overview 100 of event data used for generating an event dataset, according to certain embodiments of the present disclosure. Each event 102 corresponds to a user action. Event data 104 is collected for each event 102.

The first event 106 corresponds to a user initiating a first session using a particular website on a particular browser. The event analytics system gathers first event data 108 corresponding to first event 106. The first event data includes a cookie identifier (ID) 108A (e.g., a type of device identifier). The first event data further includes a user ID 108B, a timestamp 108C, and a page identifier 108D. The cookie ID 108A is 123. The user ID 108B is NULL (e.g., there is no known user ID). The timestamp 108C is 1. The page identifier 108D is Homepage. The first event data 108 corresponds to anonymous behavior, as the user ID is null and the cookie ID is anonymous.

The second event 110 corresponds to the user browsing products on the same website and browser. The event analytics system gathers second event data 112. The second event data includes a cookie ID 112A, a user ID 112B, a timestamp 112C, and a page identifier 112D. The cookie ID 112A is 123. The user ID 112B is NULL. The timestamp 112C is 2. The page identifier 112D is Product Detail. The second event data 112 corresponds to anonymous behavior, as the user ID is null and the cookie ID is anonymous.

The third event 114 corresponds to the user adding items to a cart on the same website and browser. The event analytics system gathers third event data 116. The second event data includes a cookie ID 116A, a user ID 116B, a timestamp 116C, and a page identifier 116D. The cookie ID 116A is 123. The user ID 116B is NULL. The timestamp 116C is 3. The page identifier 112D is Shopping Cart. The third event data 116 corresponds to anonymous behavior, as the user ID is null and the cookie ID is anonymous.

The fourth event 118 corresponds to the user checking out on the same website and browser. The event analytics system gathers fourth event data 120. The fourth event data includes a cookie ID 120A, a user ID 120B, a timestamp 120C, and a page identifier 120D. The cookie ID 120A is 123. The user ID 120B is NULL. The timestamp 120C is 4. The page identifier 120D is Check Out. The fourth event data 120 corresponds to anonymous behavior, as the user ID is null and the cookie ID is anonymous.

The fifth event 122 corresponds to the user creating an account on the same website and browser. The event analytics system gathers fifth event data 124. The fifth event data includes a cookie ID 124A, a user ID 124B, a timestamp 124C, and a page identifier 124D. The cookie ID 124A is 123. The user ID 124B is trevor. The timestamp 124C is 5. The page identifier 124D is Create Acct. The fifth event data 124 corresponds to known behavior, as the user ID is now specified, identifying the user.

The sixth event 126 corresponds to the user making a purchase on the same website and browser. The event analytics system gathers sixth event data 128. The sixth event data 128 includes a cookie ID 128A, a user ID 128B, a timestamp 128C, and a page identifier 128D. The cookie ID 128A is 123. The user ID 128B is trevor. The timestamp 128C is 6. The page identifier 128D is Purchase Page. The sixth event data 128 corresponds to known behavior, as the user ID is now specified, identifying the user.

Using event data such as that illustrated in FIG. 1, the event analytics system performs operations for managing event datasets as will now be described.

Example Operating Environment for Stitching Event Data Using Identity Mappings

Figure 2:
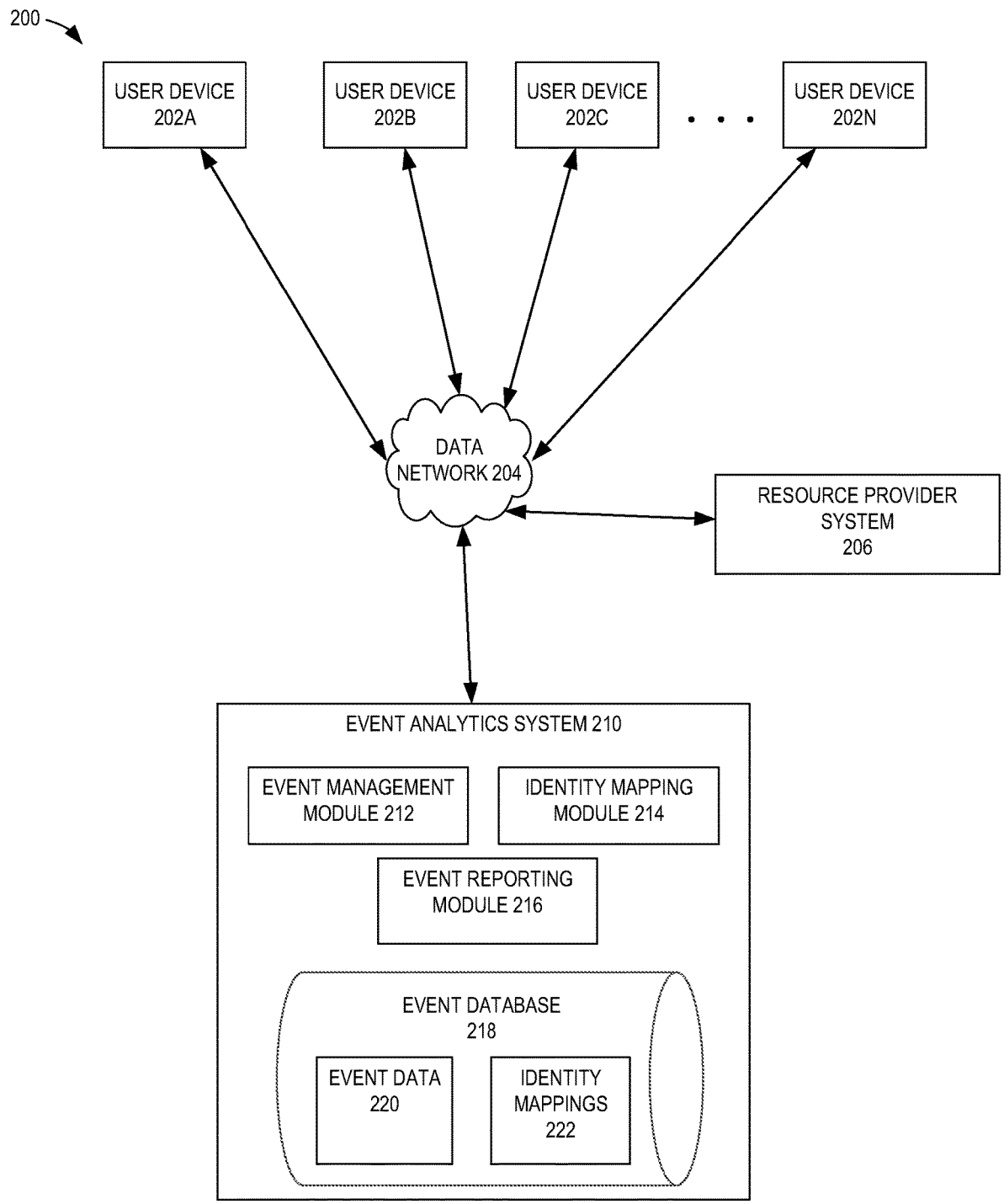
FIG. 2 depicts an example of a network environment for stitching event data using identity mappings, according to certain embodiments of the present disclosure.

Referring now to the drawings, FIG. 2 depicts an example of a network environment 200 for stitching event data using identity mappings, according to certain embodiments of the present disclosure. In the example depicted in FIG. 2, various user devices 202A, 202B, 202C, ... 202N access a resource provider system 206 via a data network 204. An event analytics system 210 analyzes events associated with the user devices 202A-202N using an event management module 212, an identity mapping module 214, and an event reporting module 216 (or other suitable program code) for performing one or more functions used in generating identity mappings 222 for user stitching based on event data 220 in an event database 218.

An identity mapping can be used for analyzing behavior of an end user, such as a consumer, based on events associated with the user. In a non-limiting example, event data 220 includes records such as browser history (e.g., based on detecting a user clicking on a link, adding an item to a cart, purchasing an item, navigating to a page, and so forth). Event data may further be associated with email exchanges, transcripts of phone calls, or in-store transactions such as a purchase or return. Event analytics system 210 uses the event data 220 to manage event datasets for analyzing correlated events, such as the behavior of a particular user over time. Event analytics system 210 updates the event datasets using identity mappings 222, which tie a particular user identifier to a particular device identifier.

Some embodiments of the network environment 200 include user devices 202A-202N. Examples of a user device include, but are not limited to, a personal computer, a tablet computer, a desktop computer, a processing unit, any combination of these devices, or any other suitable device having one or more processors. A user of the user device (e.g., 202A, 202B, 202C, or 202N) interacts with the resource provider system 206, directly or indirectly, via the data network 204.

The resource provider system 206 includes one or more computers controlled by a resource provider (e.g., resource provider computers) such as a merchant, transit provider, content provider, or any entity that can utilize event data. The resource provider system 206 may include a server computer that serves data for a website accessed by user devices 202A-202N. The resource provider system 206 may include one or more point of sale (POS) terminals that process in-store purchases. The resource provider system 206 may include call center computers that collect and store records of calls between users and customer service representatives. The resource provider system 206 may include one or more server computers that analyze and store user data (e.g., a customer relationship management (CRM) system). Alternatively, or additionally, the resource provider system 206 may interact with a third-party CRM service. By way of such components, the resource provider system 206 may generate, collect, and/or store event data. The resource provider system 206 may further include one or more displays (e.g., monitors, touchscreens, and the like) for displaying event data or derivatives thereof.

Each of the user devices 202A-202N is communicatively coupled to the resource provider system 206 and the event analytics system 210 via the data network 204. Examples of the data network 204 include, but are not limited to, internet, local area network ("LAN"), wireless area network, wired area network, wide area network, and the like.

The event analytics system 210 includes an event database 218. The event database 218 can be implemented as one or more databases or one or more data servers. The event database 218 includes event data 220 that is used by the identity mapping module 214, event management module 212, and event reporting module 216 of the event analytics system 210, as described in further detail herein. The event analytics system 210 further stores identity mappings 222 to the event database 218, which can be used to stitch the event data 220, as described in further detail herein.

Figure 8:
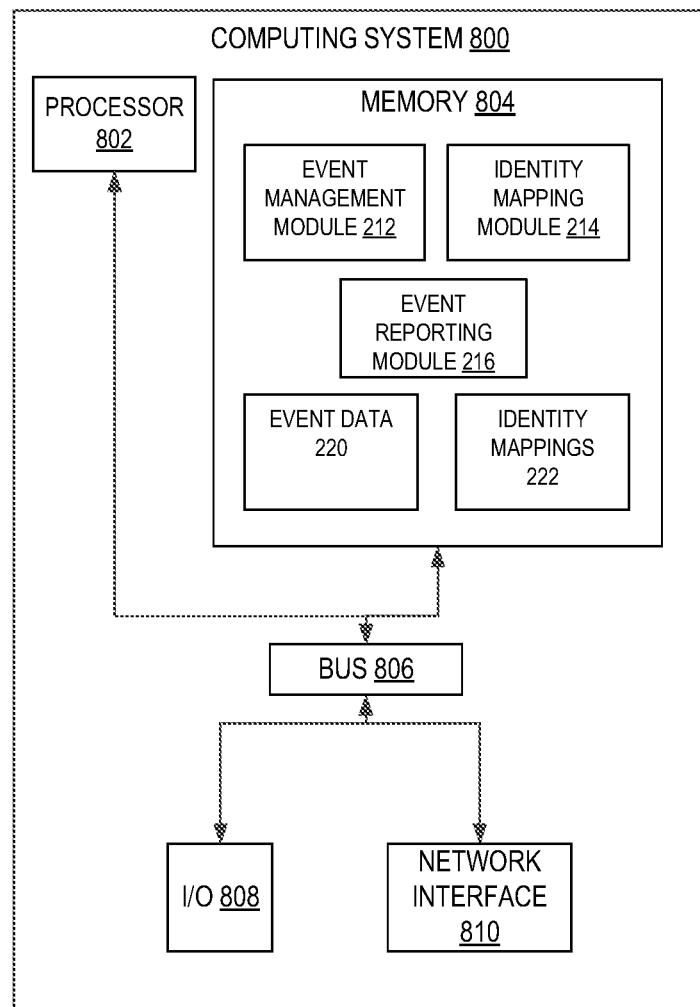
FIG. 8 depicts an example of a computing system that performs certain operations described herein, according to certain embodiments of the present disclosure.

The event management module 212 includes code configured to, in cooperation with a processor (e.g., as shown in FIG. 8), gather, generate, store, and update event data. The event management module 212 may collect event data 220 from user devices 202A-202N and/or resource provider system 206. The event management module 212 may further generate event data 220. For example, the event management module 212 may generate a timestamp based on a time that event data 220 was retrieved from a user device.

The event management module 212 may analyze event data 220 to identify common elements (e.g., a device identifier). The event management module 212 may organize event data 220 into event datasets. For example, the event management module 212 may organize event data 220 into a data table, correlate related event data 220 using pointers, or any other suitable means of organizing the event data 220.

The event management module 212 may update event datasets using an identity mapping 222. The event management module 212 may maintain predetermined look-back windows for updating event datasets. The event management module 212 may include functionality to update event datasets by adding or modifying fields of an event dataset. For example, upon identifying a user identifier, the event management module 212 may update fields of an event dataset to include the user identifier. The event management module 212 may further include functionality to update event datasets by adding data corresponding to new events.

The identity mapping module 214 includes code configured to, in cooperation with a processor (e.g., as shown in FIG. 8), generate identity mappings 222 based on event data 220. The identity mapping module 214 may include functionality to determine when a device identifier is first linked to a particular user identifier. Upon determining that the device identifier is first linked to the particular user identifier, the identity mapping module 214 may generate and store an identity mapping 222. The identity mapping module 214 may generate and store an identity mapping 222 by storing a user identifier in association with a device identifier. The identity mapping module 214 may further store a time at which the relationship between the user identifier and the device identifier was discovered as part of the identity mapping 222. In some embodiments, the identity mapping module 214 may maintain an identity mapping 222 with multiple user identifiers that correspond to a particular user (e.g., a phone number and a username).

The event reporting module 216 includes code configured to, in cooperation with a processor (e.g., as shown in FIG. 8), generate and provide event-related reports. The event reporting module 216 may, for example, convert an event dataset into a visual representation and cause display of the representation to an administrator via resource provider system 206.

Figure 3:
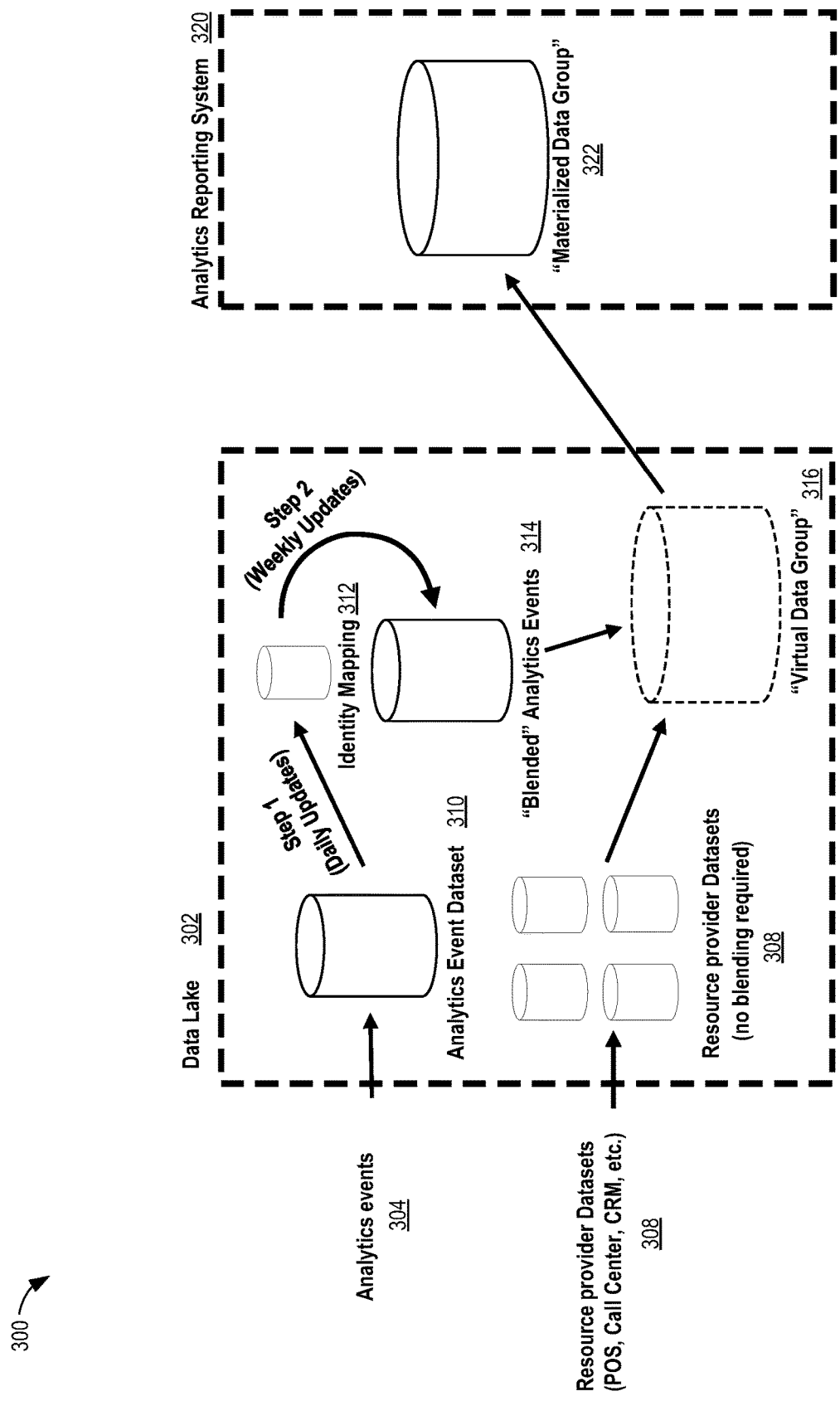
FIG. 3 depicts a schematic overview of managing event data, according to certain embodiments of the present disclosure.

FIG. 3 depicts a schematic overview of techniques for managing event data, according to certain embodiments of the present disclosure. The event analytics system may gather event data from various sources, and this data may be stored to a data lake 302. The data stored to data lake 302 may include an analytics event dataset 310. The analytics event dataset 310 may correspond to analytics events 304, which may be streamed from various user devices as users interact with browsers or applications. The data stored to the data lake 302 may further include resource provider datasets 308. The resource provider datasets 308 may be provided by one or more resource providers, originating from sources such as point of sale (POS), call center, customer relationship management (CRM), and the like.

At step 1, the event analytics system performs daily updates to an identity mapping 312. Updating the identity mapping 312 may include storing an identified user identifier in association with a device identifier. Updating the identity mapping 312 may include modifying a user identifier or a device identifier based on new event data. The identity mapping 312 may be updated on a relatively frequent basis, such as daily, twice daily, or hourly.

At step 2, the event analytics system performs weekly updates to the event dataset based on the identity mapping 312. The event analytics system may update the event dataset to include the user identifier in the identity mapping 312, as described in further detail below with respect to step 512 in FIG. 5. As a result, the event analytics system produces "blended" analytics events 314.

In some embodiments, the event analytics system merges the resource provider datasets 308 and the blended analytics events 314 to generate a virtual data group 316. The virtual data group 316 may include event datasets in a computer-readable format, which may be converted to a materialized data group 322 for administrator viewing and/or interaction via an analytics reporting system 320.

FIGS. 4A-4C depict examples of event datasets and identity mappings, according to certain embodiments of the present disclosure. FIG. 4A depicts an initial event dataset 400 containing data associated with both anonymous behavior and behavior linked to a particular user. FIG. 4B depicts an identity mapping 410 that can be used to stich or blend the initial event dataset 400. FIG. 4C depicts an updated event dataset 420 after the stitching has occurred.

Referring now to FIG. 4A, an event dataset 400 is in the form of a data table including four columns. The first column corresponds to timestamps 402 for a set of events. The second column corresponds to cookie identifiers 404 for the set of events. The third column corresponds to user identifiers 406 for the set of events. The fourth column corresponds to page identifiers 408 for the set of events.

The timestamps 402A-402F represent the times at which the respective events occurred. The cookie identifiers 404A-404F identify a device associated with the event. In this example, the cookie identifiers 404A-404F are all the same (123). The page identifiers 408A-408F represent pages associated with the events.

The first four events have blank user identifier fields 406A-406B. For these events, the cookie identifiers 404A-404D have not been associated with a particular user identifier, and the data is anonymous. The final two events have known user identifiers 406E and 406F. For the final two events, the user ID, trevor, has been identified (e.g., by the user logging in to an account). The event data for these final events has been added to the event dataset 400 along with the user identifiers 406E and 406F.

Referring now to FIG. 4B, an example of an identity mapping 410 is shown. The identity mapping 410 maps a cookie identifier 404E to a user identifier 406E. The identity mapping 410 further includes a timestamp at which the relationship was discovered. The elements of the identity mapping 410 of FIG. 4B correspond to the fifth event in the event dataset 400 of FIG. 4A. This is the point at which the relationship between the user ID trevor and the cookie ID 123 has been discovered 402E. This relationship can be used to perform user stitching using the identity mapping 410, as further detailed below with respect to FIG. 5. The timestamp corresponding to discovering the relationship 402E (e.g., 5 in this example) may be particularly useful if a device identifier is associated with different users at different times, as occurs in the case described below with respect to FIG. 6.

Referring now to FIG. 4C, the updated event dataset 420 illustrates an updated version of the event dataset 400 of FIG. 4A after performing user stitching using the identity mapping 410 illustrated in FIG. 4B.

Similarly to the event dataset 400 of FIG. 4A, the updated event dataset 420 of FIG. 4C includes a timestamp column 422, a cookie ID column 424, a user ID column 426, and a page identifier column 428. The updated event dataset 420 further includes an additional column for the "stitched" ID 430. In the "stitched" ID column 430, each entry specifies the user ID trevor discovered at timestamp 5. The event analytics system has added the column specifying the user ID trevor for each entry, including those with timestamps 1-5 which were previously not associated with a user ID.

Examples of Operations for Stitching Event Data Using Identity Mappings

Figure 5:
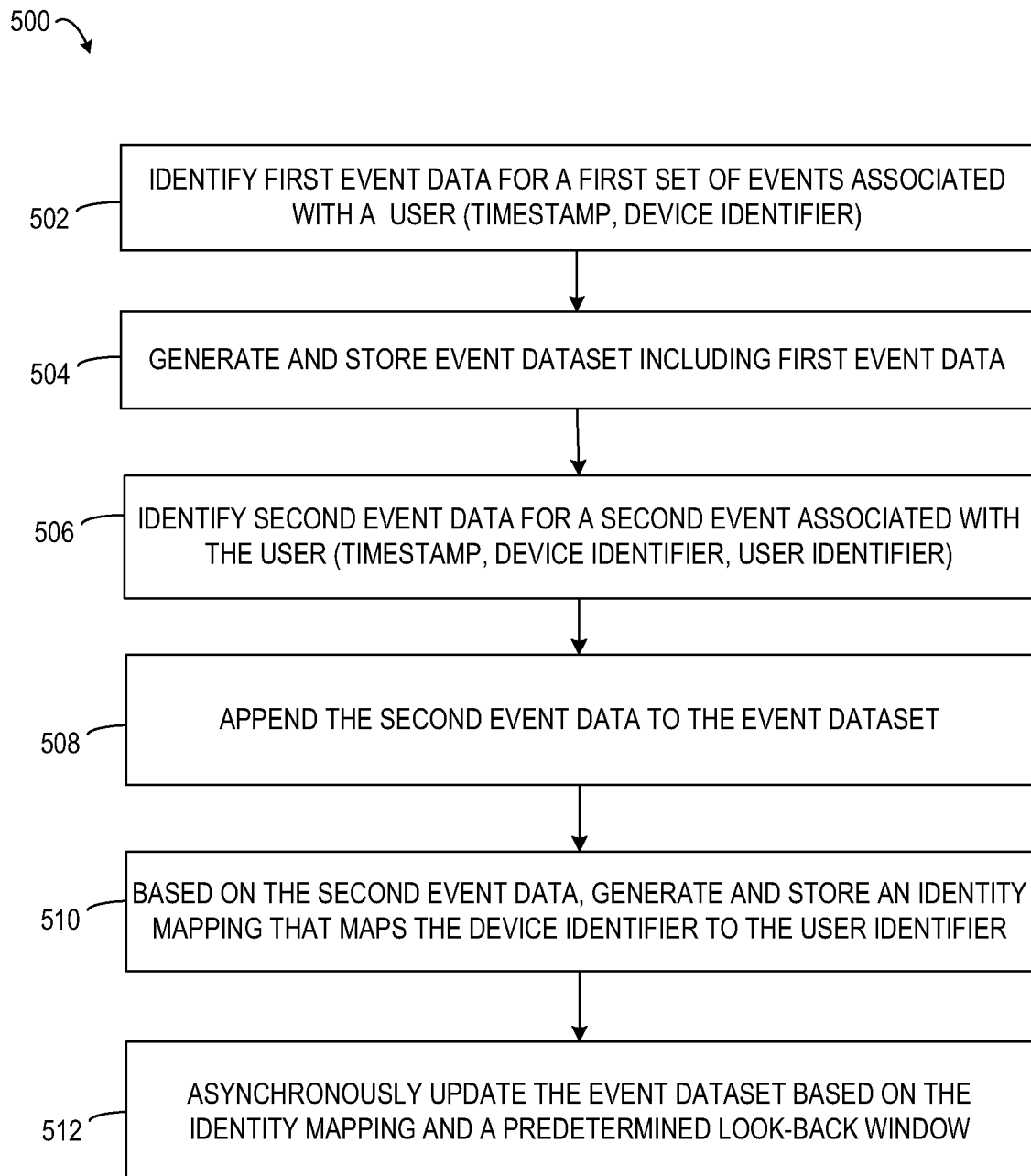
FIG. 5 depicts an example of a process for using an identity mapping to update event data, according to certain embodiments of the present disclosure.

FIG. 5 depicts an example of a process 500 for using identity mappings to update event data, according to certain embodiments of the present disclosure. The processing depicted in FIG. 5 may be implemented in software only (e.g., code, instructions, program) executed by one or more processing units (e.g., processors, cores) of the respective systems, in hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, the processing depicted in FIG. 5 may be performed by the event analytics system 210 in cooperation with other devices as illustrated in FIG. 2.

At step 502, the event analytics system identifies first event data for a first set of events associated with a user. The data for each event, of the first set of events, includes a timestamp and a device identifier. The event data may further include additional elements, such as a website identifier, location information, or any other suitable information. Identifying the event data may include retrieving event data from a user device and/or a resource provider device. Alternatively, or additionally, identifying the event data may include generating event data. For example, the event analytics system may retrieve browsing data from a user device and generate a timestamp indicating a time at which the browsing data was retrieved.

At step 504, the event analytics system generates and stores an event dataset including the first event data. The event analytics system may store a set of timestamps, a set of device identifiers, and/or other data elements in association with one another to produce the event dataset. The event analytics system may, for example, generate the event dataset by storing each event data element to an entry in a data table, e.g., as illustrated in FIG. 4A. The event analytics system may generate the event dataset such that the event dataset connects the first set of events in chronological order based on the timestamps and the device identifier.

At step 506, the event analytics system identifies second event data for a second event associated with the user. The second event data includes a timestamp, the device identifier, and a user identifier. The second event data may further include additional elements, such as a website identifier, location information, or any other suitable information. Identifying the second event data may include retrieving event data from a user device and/or a resource provider device, as well as include generating event data, as described above with respect to step 502.

At step 508, the event analytics system appends the second event data to the event dataset. Appending the second event data to the event dataset may, for example, be executed by adding additional rows to the event dataset including at least part of the second event data. In some embodiments, the event analytics system may correlate the first event data and the second event data based on the device identifier. The event analytics system may determine that the first event data and the second event data have a common element such as the device identifier.

At step 510, based on the second event data, the event analytics system generates an identity mapping that maps the device identifier to the user identifier. The event analytics stores the identity mapping. The event analytics system may generate the identity mapping by storing the device identifier in association with the user identifier (e.g., as a data table or using a pointer). The identity mapping may further include a timestamp indicating a time at which the relationship between the user identifier and the device identifier was discovered. An example of such an identity mapping is shown in FIG. 4B.

In some embodiments, the event analytics system may generate the identity mapping by querying the event dataset. The event dataset is scanned either in its entirety, or back to a suitable time frame to limit the computational effort needed to create the identity mapping. Events may be filtered where the device identifier and the user identifier are present (a.k.a. authenticated rows). The event analytics system may group the event dataset by the device identifier, and then check to see if the user identifier is a new assignment (no previous rows), the same assignment (preceded by rows with the same user identifier), or a change in assignment (the immediately preceding row has a different user identifier). In the cases of a new or changed assignment, a new identity mapping is recorded, along with the event timestamp of the row, forming a tuple of (timestamp, device identifier, user identifier). This process may be repeated for a set of stored device identifiers, and new mappings may be saved to a new identity mapping dataset. In some embodiments, the identity mapping datasets are partitioned by time.

Alternatively, or additionally, in some embodiments, the event analytics system may receive an identity mapping from the resource provider system. For example, some more sophisticated resource providers may generate their own identity mappings based on internal customer data.

At step 512, the event analytics system asynchronously updates the event dataset based on the identity mapping and a predetermined look-back window. The event analytics system may identify a stored look-back window of, for example, one week. The event analytics system may locate event data which was gathered and stored within the last week by comparing the look-back window and the current date and time to the timestamps in the event dataset.

The event analytics system may update the event dataset by adding the user identifier to the event dataset (e.g., by adding or modifying fields in the event dataset). In some embodiments, the event analytics system adds the user identifier to the event dataset by performing a left join of the identity mapping generated at step 510 and the event dataset generated at step 504. An example of updating the event dataset to include the user identifier using the event mapping is illustrated in FIGS. 4A-4C, where a new column (430A-430F) with the user identifier has been added to the event dataset. Alternatively, or additionally, preexisting fields of the event dataset may be modified to include the user identifier in the identity mapping. For example, referring to FIG. 4C, the User ID fields 426A-426F can be modified to include the discovered user identifier.

In some embodiments, the event analytics system updates the event dataset at step 512 asynchronously to generating and storing the event dataset at step 504. The event analytics system may further append the second event data to the event dataset at step 508 asynchronously to updating the event dataset at step 512 and generating and storing the event dataset at step 504. The generating, storing, and appending data to the event dataset may be executed substantially in real time, while the update of step 512 occurs at a later time based on the look-back window. In some embodiments, a second look-back window may be used to append additional event data per step 508. For example, a daily look-back window may be used to append additional event data gathered for the day to the event dataset. A weekly look-back window may then be used to stitch in updated information such as a user identifier. Accordingly, the identity mapping may be generated and updated to add additional event data on an ongoing basis, while breaking down stitching updates into relatively small batches that are relatively quick to process.

In some embodiments, after step 512, the event analytics system generates a report of the event dataset in association with the user. The event analytics system may convert the event dataset to a user-friendly form such as a spreadsheet, table, or chart. The event analytics system may further use the event dataset to generate summary data for reporting (e.g., user 1 purchased a car after speaking to a customer service representative and visiting three dealerships).

In some embodiments, the event analytics system may generate a visualization of the report—for example, by generating instructions for rendering a chart or graph illustrating the event dataset or a derivative thereof. The event analytics system may provide information for display of the visualization to the resource provider computer. For example, the event analytics system transmits the instructions for rendering the visualization to the resource provider computer over a network. By transmitting the instructions for rendering the visualization to the resource provider computer, the event analytics system can cause the resource provider computer to display the visualization of the report on a display component of the resource provider computer.

In some embodiments, the event analytics system may receive event data that was generated offline. For example, the event data may correspond to an in-person interaction and the data may have been generated locally on a POS terminal in a store. As a specific example, the user may type in a user identifier, a phone number, at the POS terminal. As another example, the event data may be retrieved from a call center log corresponding to a conversation with a call center representative, and the event data may have been generated locally on the representative's computer as the representative filled out a form characterizing the conversation. As another example, the event data may correspond to third-party customer data such as CRM data which was acquired through in-person interactions. Such offline data may be received by the event analytics system from the resource provider system.

As a specific example of use of offline data, after the operations of FIG. 5, an event dataset may be established including first event data and second event data as described above. At this point, the event analytics system may receive third event data for a third event. The third event data may include a timestamp and the user identifier. The third event data was generated offline based on an in-store event. The event analytics system appends the third event data to the event dataset.

Figure 6:
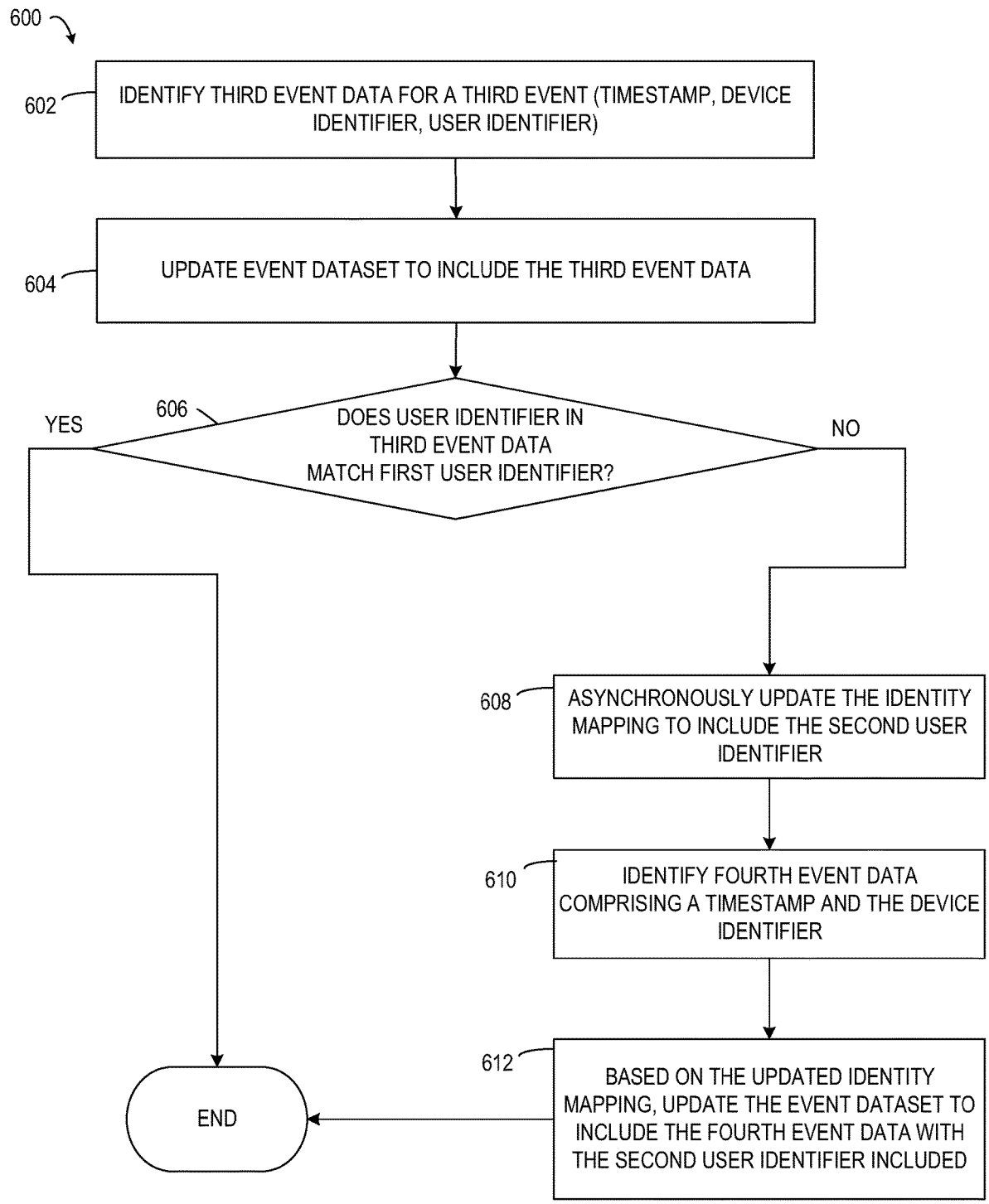
FIG. 6 depicts an example of a process for stitching event data with a single device identifier across multiple users, according to certain embodiments of the present disclosure.

FIG. 6 depicts an example of a process for stitching event data with a single device identifier across multiple users, according to certain embodiments of the present disclosure. The operations of FIG. 6 may be performed by the event analytics system 210 in cooperation with other devices as illustrated in FIG. 2. In some cases, multiple users may use a device, and browser data gathered from the device (e.g., with a single device identifier) may actually correspond to two or more users. The techniques of FIG. 6 can be used to split the device identifier to the appropriate users. Prior to the operations of FIG. 6, the event analytics system may perform the operations described above with respect to FIG. 5, resulting in a first event dataset tied to a particular device identifier and a first user identifier.

At step 602, the event analytics system identifies third event data for a third event. The third event data includes a timestamp, the device identifier, and a user identifier. The event data may further include additional elements, such as a website identifier, location information, or any other suitable information. The event data may be identified in a substantially similar fashion as described above with respect to step 502 of FIG. 5.

At step 604, the event analytics system updates the event dataset to include the third event data. This may be performed in a substantially similar fashion as described above with respect to step 508 of FIG. 5.

At step 606, the event analytics system determines whether the user identifier in the third event data received in step 602 matches the first user identifier in the first event dataset generated in the process of FIG. 5. The event analytics system may compare the user identifiers to determine whether the user identifiers are the same as, or different from, one another.

At step 608, if the user identifier in the third event data does not match the first user identifier, then the event analytics system asynchronously updates the identity mapping to include the second user identifier. The event analytics system may modify the identity mapping generated at step 510 of FIG. 5. Alternatively, or additionally, the event analytics system may store another identity mapping with the second user identifier. The event analytics system may use a field of the identity mapping specifying the time the relationship was established (e.g., 402E of FIG. 4B) to determine which user identifier to use at a given time. The event analytics system may update the identity mapping to include the event mapping asynchronously to identifying the third event data and/or updating the event dataset to include the third event data.

At step 610, the event analytics system identifies fourth event data for a fourth event associated with the second user. The fourth event data includes a timestamp and the device identifier. The fourth event data may be anonymous, e.g., not include a user identifier. Identifying the fourth event data may be executed in a substantially similar fashion as identifying the first event data, as described above with respect to step 502 of FIG. 5.

At step 612, the event analytics system updates the event dataset to include the fourth event data, based on the identity mapping updated at step 608. The event analytics system includes the second user identifier when storing the fourth event data to the event dataset. Although the device identifier has been linked to the first user identifier and the second user identifier at different times, the event analytics system may (e.g., based on the timestamps) select the most recently used user identifier, and store ensuing anonymous data to the event dataset in association with the appropriate user identifier.

Figure 7:
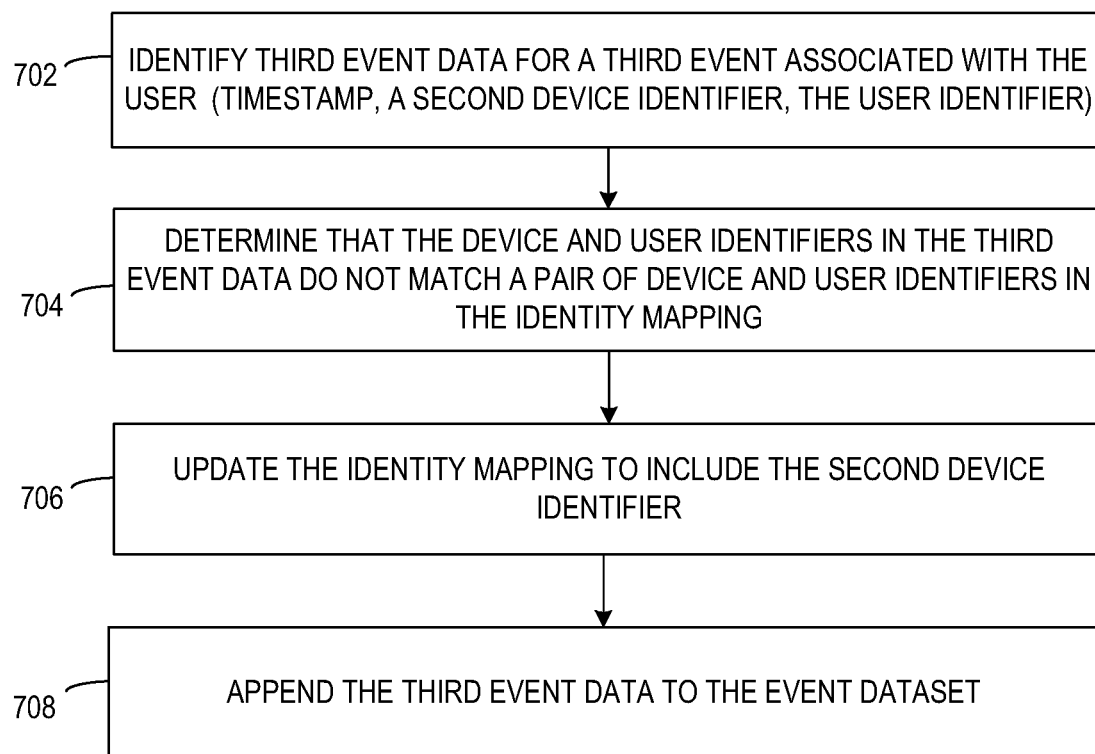
FIG. 7 depicts an example of a process for stitching event data with a single user identifier across multiple device identifiers, according to certain embodiments of the present disclosure.

FIG. 7 depicts an example of a process for stitching event data with a single user across multiple device identifiers, according to certain embodiments of the present disclosure. The operations of FIG. 7 may be performed by the event analytics system 210 in cooperation with other devices as illustrated in FIG. 2. In some cases, a particular user may use various different devices and browsers. The operations of FIG. 7 provide a way to tie together this user data to the user across devices. Prior to the operations of FIG. 7, the event analytics system may perform the operations described in FIG. 5, resulting in an event dataset tied to a particular user identifier and a first device identifier.

At step 702, the event analytics system identifies third event data for a third event associated with the user. The third event data includes a timestamp, a second device identifier, and the user identifier. Identifying the second device identifier in association with the same user identifier may correspond to the user switching to a different browser and/or device. Identifying the third event data may be executed in a substantially similar fashion as identifying the first event data, as described above with respect to step 502 of FIG. 5.

At step 704, the event analytics system determines that the device and user identifiers in the third event data do not match a pair of device and identifiers in the identity mapping. The event analytics system may, for example, determine that the user identifier is stored in association with a different device identifier and, accordingly, the second device identifier and the user identifier represent a new pairing.

At step 706, the event analytics system updates the identity mapping to include the second user identifier based on the determination of step 704. In some embodiments, the event analytics system may edit the identity mapping to replace the first user identifier with the second user identifier. Alternatively, or additionally, the event analytics system may generate a second identity mapping for the user with the second device identifier, while retaining the first identity mapping for the user with the first device identifier. As another example, the event analytics system may maintain an identity mapping with multiple device identifiers that correspond to a particular user.

At step 708, the event analytics system appends the third event data to the event dataset. The event analytics system includes the second device identifier when appending the third event data to the event dataset. The event analytics system may append the third event data to the event dataset, for example, by updating data fields and/or by performing a structured query language (SQL) join operation. In some embodiments, the event analytics system may append the third event data to the event dataset based on determining that the user identifier identified in the third event data matches the user identifier in the identity mapping.

By updating the event data and identity mappings asynchronously using one or more look-back windows, the event data can be managed significantly more efficiently than in prior systems that gather and stich large amounts of event data simultaneously. Additional improvements and advantages include allowing resource providers to have access to both stitched and non-stitched data, and allowing for reports to be run back to the start of data collection. In many cases, this is years' worth of data.

Embodiments use SQL as opposed to proprietary software and customer scripting (which can be difficult to set up and maintain). Using SQL allows for resource providers with fewer specialized skillsets to customize ID mapping generation. It also facilitates re-use of code across customers, improving efficiency and reducing consulting fees.

EXAMPLE EMBODIMENT

As a specific example, an identity mapping is generated in two phases: 1) initial creation and 2) appending to the dataset as new mappings are discovered. The identity mapping is a table, and the operations such as lag and window are SQL functions.

Initial Creation

The process to create a new identity mapping from an event dataset is as follows:
1. Either using the entire event dataset, or a historical subset of the data, remove rows without a user ID
2. Sort by event time and then user ID.
3. Group by the cookie ID.
4. Use window function to lag user ID by 1 and filter on rows where:
   a. lagged-user ID is NULL (finding where a cookie ID is first mapped to a user ID)
   b. lagged-user ID does NOT equal user ID (finding where cookie ID changes from one user ID to another)
5. Project the cookie ID, user ID, and timestamp into a new dataset The window function can be used to only record when a cookie ID changes its user ID, thus limiting the size of the identity mapping dataset.

Frequent Updates

After an identity mapping dataset has been generated the first time, it is desirable to keep it up to date with new mappings as events occur in an event stream. In this example, a query is scheduled to run once a day, which would identify any new mappings and append them to the identity mapping dataset.

An overview of this query:

1. Limiting the event data to the past day (depends on the frequency of when the query runs), use steps 1-4 of the creation query to create a "Day Mapping"
2. Union the Day Mapping with the full ID mapping dataset
3. Now take the results and perform an "anti-left join" against the full ID mapping dataset—this ensures that we only have net new mappings
4. Project the cookie ID, user ID, and timestamp and append to the identity mapping dataset Generating Identity Mapping The event management system creates a new dataset named id_map by looking at all events for the month of May and discovering tuples between cookie IDs and user IDs. The time this mapping first occurred is also tracked. After the initial creation of the identity mapping dataset, the identity mapping is incrementally updated using a query that is run once a day. The identity mapping may, for example, be generated using a query with a lookback window of 30 days.

Updating Event Dataset

Similar to the identity mapping dataset, the event dataset is first created, which will hold the re-keyed or stitched events. The event dataset was first created using a query that executed an initial JOIN against the ID mapping. The same query is rerun against a lookback window of data on a regular cadence to further update the stitched dataset with new records. Windowing functions are used to help determine what ID mapping an event should be connected with.

The logic of the join is:
1. Sort the ID mapping by hit_time (the time at which the relationship between the user ID and cookie ID was discovered).
2. Use window function on the ID mapping to both lead hit_time and lag hit_time by 1, partitioning by the cookie ID.
3. Perform the join on the windowed subquery, joining where the event's cookie ID equals the mapping's cookie ID and one of the following is true:
   a. Event timestamp>=mapping timestamp AND event timestamp<leading hit_time. This means that the event happened between two mappings—it happened between the current mapping and before the next mapping. This covers "cookie splitting" where a cookie ID can change customer ID ownership.
   b. Event timestamp<mapping timestamp AND the lagging hit_time is NULL. This means cookie ID was never assigned to customer ID earlier than the event timestamp. This covers the case where an anonymous cookie ID has now become associated with a customer ID and is part of the historical restatement use case.
   c. Event timestamp>=mapping timestamp AND leading hit_time is NULL. This means the event happened after the last known mapping and should therefore be associated with the last known customer ID.
4. Perform a final projection making the customer ID be our primary identifier if it is not NULL (if a match was found in the join), otherwise fallback to the default primary identifier (in this case the cookie ID).

The update version of this query would be run in two places:
1. As part of a SQL View inside of the data ingestion process. Each batch of data it consumes would be run through this view, re-keying the incoming data and giving the customer the ability to see "stitched" data very soon after its arrival.
2. As part of a weekly "re-processing" phase where we get up to 90 days of the event dataset and run it through this JOIN. This will help us restate historical events as being associated with newly discovered mappings.

A join is performed against the "id_map" dataset generated previously. Further queries may be run, re-keying an additional week at a time and appending it to the end of the stitched dataset. Subsequent queries can be used to stitch other weeks.

Example of a Computing System for Stitching Event Data Using Identity Mappings

Any suitable computing system or group of computing systems can be used for performing the operations described herein. For example, FIG. 8 depicts examples of a computing system 800 (which may be substantially similar to the event analytics system 210 of FIG. 2) that executes an event management module 212 and an identity mapping module 214. In some embodiments, the computing system 800 also executes an event reporting module 216, as depicted in FIG. 8. In other embodiments, a separate computing system having devices similar to those depicted in FIG. 8 (e.g., a processor, a memory, etc.) executes the event reporting module 216.

The depicted examples of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the event management module 212, the identity mapping module 214, the event reporting module 216, or other suitable applications that perform one or more operations described herein. The program code may be resident in the memory device 804 or any suitable computer-readable medium and may be executed by the processor 802 or any other suitable processor. The memory 804 may further store event data 220 and identity mappings 222. In some embodiments, the event management module 212, the identity mapping module 214, the event reporting module 216, the event data 220, and the identity mappings 222 are stored in the memory device 804, as depicted in FIG. 8. In additional or alternative embodiments, one or more of the event management module 212, the identity mapping module 214, the event reporting module 216, the event data 220, and the identity mappings 222 are stored in different memory devices of different computing systems. In additional or alternative embodiments, the program code described above is stored in one or more other memory devices accessible via a data network.

The computing system 800 can access one or more of the event data 220 and the identity mappings 222 in any suitable manner. In some embodiments, some or all of one or more of these datasets, models, and functions are stored in the memory device 804, as in the example depicted in FIG. 8. For example, a computing system 800 that executes the event management module 212 can provide access to the event data 220 by external systems that execute the event reporting module 216.

In additional or alternative embodiments, one or more of these datasets, models, and functions are stored in the same memory device (e.g., memory 804). For example, a common computing system, such as the event analytics system 210 depicted in FIG. 2, can host the identity mapping module 214 and the event reporting module 216 as well as the identity mappings 222. In additional or alternative embodiments, one or more of the programs, datasets, models, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices (e.g., a resource provider system 206, as shown in FIG. 2) via a data network using the network interface device 810.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method comprising:

generating and storing, by an event analytics system, an event dataset including first event data for a set of events associated with a particular user, the first event data comprising a plurality of timestamps and a device identifier, wherein the event dataset connects the set of events associated with the particular user in chronological order based on the timestamps and the device identifier;

identifying, by the event analytics system, second event data for a second event associated with the particular user, the second event data for the second event comprising a timestamp, the device identifier, and a user identifier value for the particular user;

appending, by the event analytics system, the second event data to the event dataset;

based on the second event data, generating and storing, by the event analytics system, an identity mapping that maps the device identifier to the user identifier value for the particular user, wherein the event analytics system generates the identity mapping by storing the device identifier in association with the user identifier value for the particular user;

determining, by the event analytics system, a predetermined look-back window for locating event data that was gathered and stored in a time period corresponding to the look-back window;

comparing, by the event analytics system, the look-back window and a current date and time to the timestamps in the event dataset;

based on the identity mapping and the comparison to the predetermined look-back window, updating, by the event analytics system, the first event data to include the user identifier value for the particular user, wherein the event analytics system updates the first event data asynchronously to generating and storing the event dataset, wherein the event analytics system updates the first event data to include the user identifier value for the particular user in a user identifier field by joining the identity mapping and the event dataset;

determining, by the event analytics system based on the event data, user behavior; and performing, by the event analytics system, an action with respect to the user based on the determined user behavior.

2. The method of claim 1, wherein the particular user is a first user and the event dataset is a first event dataset, the method further comprising:

identifying, by the event analytics system, third event data for a third event associated with a second user, the third event data comprising a second timestamp, the device identifier, and a second user identifier;

updating the event dataset to include the third event data; and asynchronously to updating the event dataset to include the third event data, generating an updated identity mapping by modifying the identity mapping to include the second user identifier.

3. The method of claim 2, further comprising:

identifying, by the event analytics system, fourth event data for a fourth event associated with the second user, the fourth event data comprising a third timestamp and the device identifier; and updating, by the event analytics system based on the updated identity mapping, the event dataset to include the fourth event data with the second user identifier included.

4. The method of claim 1, wherein the device identifier is a first device identifier, the method further comprising:

identifying, by the event analytics system, third event data for a third event, the third event data for the third event comprising a second timestamp, a second device identifier, and the user identifier value for the particular user;

updating, by the event analytics system, the identity mapping to include the second device identifier; and appending, by the event analytics system, the third event data to the event dataset with the second device identifier included.

5. The method of claim 1, further comprising:

generating, by the event analytics system, a report of the event dataset in association with the particular user;

generating, by the event analytics system, a visualization of the report; and providing, by the event analytics system to a resource provider computer, information for display of the visualization of the report, thereby causing the resource provider computer to display the visualization of the report on a display component of the resource provider computer.

6. A computing system comprising a processor and a non-transitory computer-readable medium coupled to the processor, the non-transitory computer-readable medium including instructions which, when executed by the processor, cause performance of a method comprising:

generating and storing an event dataset including first event data for a set of events associated with a particular user, the first event data comprising a plurality of timestamps and a device identifier, wherein the event dataset connects the set of events associated with the particular user in chronological order based on the timestamps and the device identifier;

identifying second event data for a second event associated with the particular user, the second event data comprising a timestamp, the device identifier, and a user identifier value for the particular user;

appending the second event data to the event dataset;

based on the second event data, generating and storing an identity mapping that maps the device identifier to the user identifier value for the particular user, wherein the system generates and stores the identity mapping by storing the device identifier in association with the user identifier value for the particular user, wherein the computing system updates the first event data to include the user identifier value for the particular user in a user identifier field by joining the identity mapping and the event dataset;

determining a predetermined look-back window for locating event data that was gathered and stored in a time period corresponding to the look-back window;

comparing the look-back window and a current date and time to the timestamps in the event dataset;

based on the identity mapping and the comparison to the predetermined look-back window, updating the first event data to include the user identifier value for the particular user, wherein the computing system updates the first event data asynchronously to generating and storing the event dataset;

determining, based on the event data, user behavior; and performing an action with respect to the user based on the determined user behavior.

7. The system of claim 6, wherein the particular user is a first user and the event dataset is a first event dataset, the method further comprising:

identifying third event data for a third event associated with a second user, the third event data comprising a second timestamp, the device identifier, and a second user identifier;

updating the event dataset to include the third event data; and asynchronously to updating the event dataset to include the third event data, generating an updated identity mapping by modifying the identity mapping to include the second user identifier.

8. The system of claim 7, further comprising:

identifying fourth event data for a fourth event associated with the second user, the fourth event data comprising a third timestamp and the device identifier; and updating, based on the updated identity mapping, the event dataset to include the fourth event data with the second user identifier included.

9. The system of claim 6, wherein the device identifier is a first device identifier, the method further comprising:

identifying third event data for a third event; the third event data comprising a second timestamp, a second device identifier, and the user identifier value for the particular user;

updating the identity mapping to include the second device identifier; and appending the third event data to the event dataset with the second device identifier included.

10. The system of claim 6, the method further comprising:
generating a report of the event dataset in association with the particular user;
generating a visualization of the report; and
providing, to a resource provider computer, information for display of the visualization of the report, thereby causing the resource provider computer to display the visualization of the report on a display component of the resource provider computer.

11. A non-transitory computer-readable medium having instructions stored thereon, the instructions executable by a processing device to perform a method comprising:
generating and storing an event dataset including first event data for a set of events associated with a particular user, the first event data comprising a plurality of timestamps and a device identifier, wherein the event dataset connects the set of events associated with the particular user in chronological order based on the timestamps and the device identifier;
identifying second event data for a second event associated with the particular user, the second event data comprising a timestamp, the device identifier, and a user identifier value for the particular user;
appending the second event data to the event dataset;
based on the second event data, generating and storing an identity mapping that maps the device identifier to the user identifier value for the particular user, wherein the identity mapping is generated and stored by storing the device identifier in association with the user identifier value for the particular user;
determining a predetermined look-back window for locating event data that was gathered and stored in a time period corresponding to the look-back window;
comparing the look-back window and a current date and time to the timestamps in the event dataset;
based on the identity mapping and the comparison to the predetermined look-back window, updating the first event data to include the user identifier value for the particular user, wherein the first event data is updated asynchronously to generating and storing the event dataset, wherein the first event data is updated to include the user identifier value for the particular user in a user identifier field by joining the identity mapping and the event dataset;
determining, based on the event data, user behavior; and
performing an action with respect to the user based on the determined user behavior.

12. The non-transitory computer-readable medium of claim 11, wherein the particular user is a first user and the event dataset is a first event dataset, the method further comprising:
identifying third event data for a third event associated with a second user, the third event data comprising a second timestamp, the device identifier, and a second user identifier;
updating the event dataset to include the third event data; and
asynchronously to updating the event dataset to include the third event data, generating an updated identity mapping by modifying the identity mapping to include the second user identifier.

13. The non-transitory computer-readable medium of claim 12, the method further comprising:
identifying fourth event data for a fourth event associated with the second user, the fourth event data comprising a third timestamp and the device identifier; and
updating, based on the updated identity mapping the event dataset to include the fourth event data with the second user identifier included.

14. The non-transitory computer-readable medium of claim 11, wherein the device identifier is a first device identifier, the method further comprising:
identifying third event data for a third event; the third event data comprising a second timestamp, a second device identifier, and the user identifier value for the particular user;
updating the identity mapping to include the second device identifier; and
appending the third event data to the event dataset with the second device identifier included.

* * * * *